(12) United States Patent
Karras (10) Patent No.: US 12,127,666 B2
(45) Date of Patent: Oct. 29, 2024

(54) ANIMAL HAIRBRUSH

(71) Applicant: Vasiliki Karras, Granite Bay, CA (US)

(72) Inventor: Vasiliki Karras, Granite Bay, CA (US)

( * ) Notice: Subject to any disclaimer, the term of this patent is extended or adjusted under 35 U.S.C. 154(b) by 360 days.

(21) Appl. No.: 17/398,950

(22) Filed: Aug. 10, 2021

(65) Prior Publication Data

US 2022/0061518 A1 Mar. 3, 2022

Related U.S. Application Data

(60) Provisional application No. 63/103,477, filed on Aug. 10, 2020.

(51) Int. Cl.
| | |
|---|---|
| *A01K 13/00* | (2006.01) |
| *A45D 24/42* | (2006.01) |
| *A46B 9/02* | (2006.01) |
| *A46B 17/06* | (2006.01) |
| *A47L 25/00* | (2006.01) |

(52) U.S. Cl.
CPC ............ *A46B 17/06* (2013.01); *A01K 13/002* (2013.01); *A45D 24/42* (2013.01); *A46B 9/023* (2013.01); *A47L 25/005* (2013.01); *A46B 2200/104* (2013.01)

(58) Field of Classification Search
CPC ....... A45D 24/40; A45D 24/42; A47L 25/005; A47L 25/08; A01K 13/002; A01K 13/00; A01K 13/001; A46B 2200/10; A46B 17/04; A46B 17/06; A46B 2200/104
See application file for complete search history.

(56) References Cited

U.S. PATENT DOCUMENTS

| | | | |
|---|---|---|---|
| 7,823,244 B2* | 11/2010 | Knopow | A47L 25/005 15/104.002 |
| 2005/0066464 A1* | 3/2005 | McKay | A01K 13/002 15/104.94 |
| 2007/0180638 A1* | 8/2007 | McKay | A46B 13/023 15/22.1 |
| 2011/0265807 A1* | 11/2011 | Fasse | A46B 15/0055 132/119 |
| 2017/0280680 A1* | 10/2017 | Czajkowski | A01K 13/002 |
| 2018/0020820 A1* | 1/2018 | Crone | A46B 5/0095 15/1.52 |

* cited by examiner

*Primary Examiner* — Randall E Chin (57) ABSTRACT

An animal hairbrush having a handle and a brush head with various bristles for grooming animal hair. The animal hairbrush includes a removable cover having a rigid base and a hair binding layer. The hair binding layer is adapted to collect the animal hair. The removable cover has a plurality of perforations into which the various bristles on the brush head are aligned and placed within. The removable cover may be embodied as a plurality of removable sheets layered on top of each other and onto the rigid base. The hair binding layer may be an adhesive layer.

7 Claims, 7 Drawing Sheets

ANIMAL HAIRBRUSH

CROSS REFERENCE TO RELATED APPLICATION

This application is a Non-Provisional Application, which claims priority to U.S. Provisional Application Ser. No. 63/103,477 filed Aug. 10, 2020, the contents of all of which are hereby incorporated by reference herein in their entirety into this disclosure.

TECHNICAL FIELD

The subject disclosure relates to pet grooming products, and in particular to providing a pet hairbrush having a replaceable layer designed to remove hair when the hair of the animal is brushed.

BACKGROUND

Pet grooming is vital to the well-being and healthiness of a pet. Regular brushing and removal of dead hair has numerous advantages, many of which include decreasing the chances of skin problems by distributing natural oils for a clean and healthy coat, stimulates the surface of the skin, gets rid of dead and dry skin, reduces infestation of external parasites on skin, promotes bonding, and helps a pet owner become familiar with their pets body by constantly monitoring the animal's health by checking for cuts, heat, swelling, or changes in temperament, all of which could be indicative of illness.

One of the most challenging issues with a pet brush is the constant cleaning and removal of collected hair from the brush head. Thus, there is a need for an improved pet hairbrush that is easy to use and clean between uses.

SUMMARY OF THE SUBJECT DISCLOSURE

The present subject disclosure presents a simplified summary of the subject disclosure in order to provide a basic understanding of some aspects thereof. This summary is not an extensive overview of the various embodiments of the subject disclosure. It is intended to neither identify key or critical elements of the subject disclosure nor delineate any scope thereof. The sole purpose of the subject summary is to present some concepts in a simplified form as a prelude to the more detailed description that is presented hereinafter.

While various aspects, features, or advantages of the subject disclosure are illustrated in reference to a pet hairbrush, such aspects and features also can be exploited for various other animals with various textures.

To the accomplishment of the foregoing and related ends, the subject disclosure, then, comprises the features hereinafter fully described. The following description and the annexed drawings set forth in detail certain illustrative aspects of one or more embodiments of the disclosure. However, these aspects are indicative of but a few of the various ways in which the principles of the subject disclosure may be employed. Other aspects, advantages and novel features of the subject disclosure will become apparent from the following detailed description of various example embodiments of the subject disclosure when considered in conjunction with the drawings.

In one exemplary embodiment, the present subject disclosure is an animal hairbrush. The animal hairbrush includes a brush head having various bristles for grooming animal hair. A handle is attached to the brush head. The animal hairbrush further includes a removable cover having a rigid base and a hair binding layer. The hair binding layer is adapted to collect the animal hair. The removable cover has a plurality of perforations into which the various bristles on the brush head are aligned and placed within. The removable cover may be embodied as a plurality of removable sheets layered on top of each other and onto the rigid base. The hair binding layer may be an adhesive layer.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

Particular embodiments of this subject disclosure will now be described in greater detail with reference to the figures.

The subject disclosure is described with reference to the drawings, wherein like reference numerals are used to refer to like elements throughout. In the following description, for purposes of explanation, numerous specific details are set forth in order to provide a thorough understanding of the present disclosure. It may be evident, however, that the present disclosure may be practiced without these specific details.

Various exemplary embodiments of the subject disclosure are presented throughout the figures. Multiple perspective views of a pet treat holder according to an exemplary embodiment of the present subject disclosure are presented in various embodiments.

Figure 1:
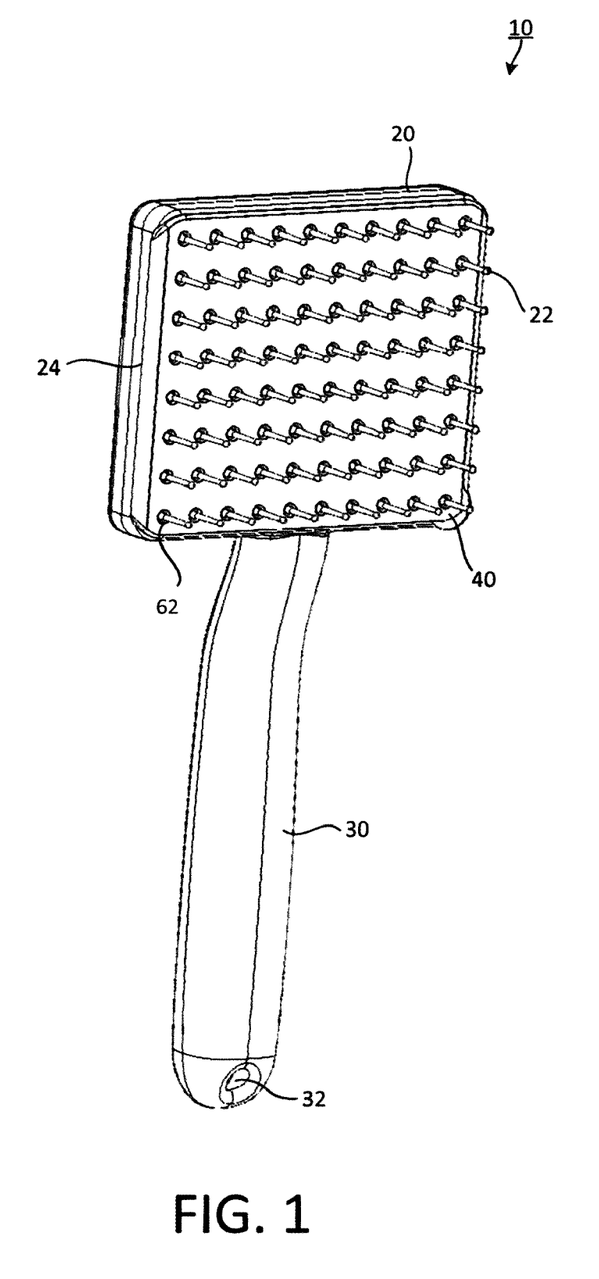
FIG. 1 illustrates a front perspective view of the animal hairbrush according to this subject disclosure.
Figure 2:
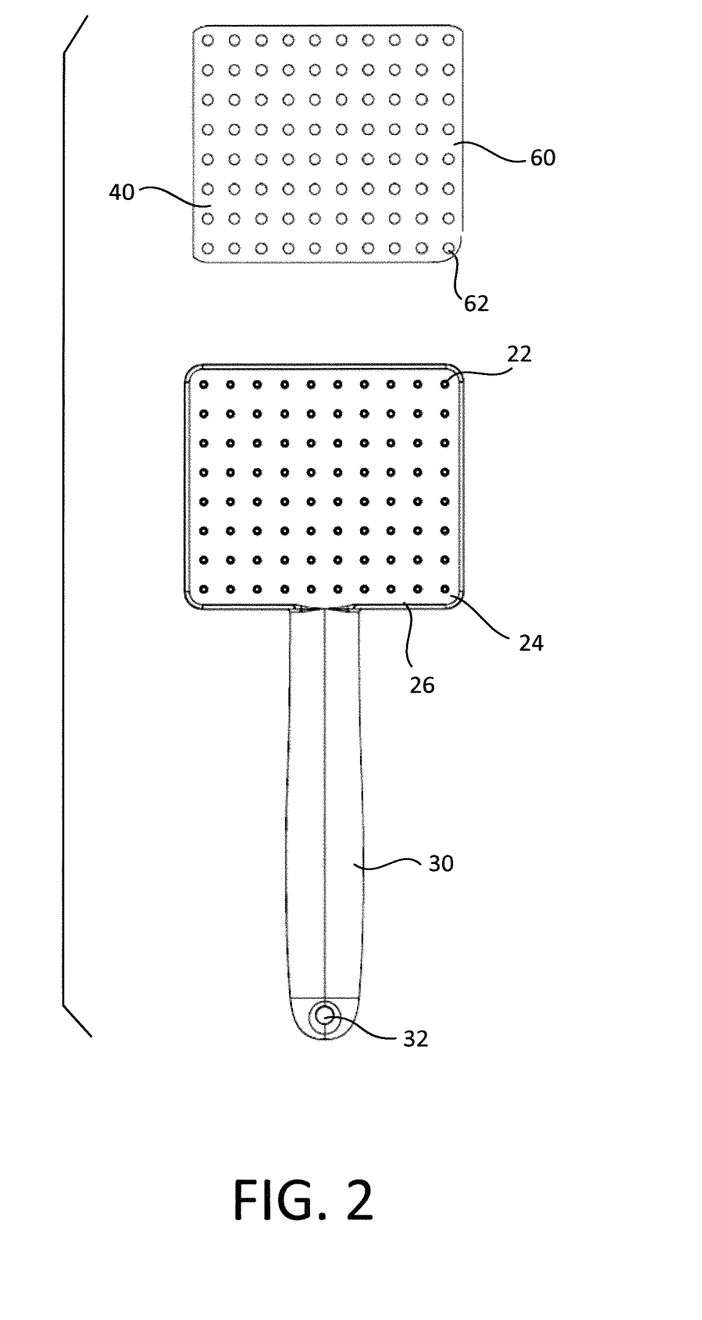
FIG. 2 is a front view of the animal hairbrush with the removable cover lifted off the brush head.

FIGS. 1-2 shows an animal hairbrush 10 for grooming animal hair according to the present subject disclosure. The animal hairbrush 10 includes a brush head 20 with a handle 30 and a removable cover 40.

The brush head 20 has various bristles 22 that extend from the brush head 20. The bristles 22 may be long thick bristles. Although the brush head 20 is shown rectangular in shape, it is to be understood that the brush head 20 can be configured in any size or shape.

The handle 30 extends from the brush head 20 and is adapted to be gripped by a user to guide the brush head 20 through the hair of the animal. An aperture 32 may be provided to hang the animal hairbrush 10. Brushing through the animal hair removes tangles, matting and/or other debris that may be entangled in the animal's hair. The shape of the handle 30 may be any suitable shape to be securely and ergonomically held by the user.

Figure 3:
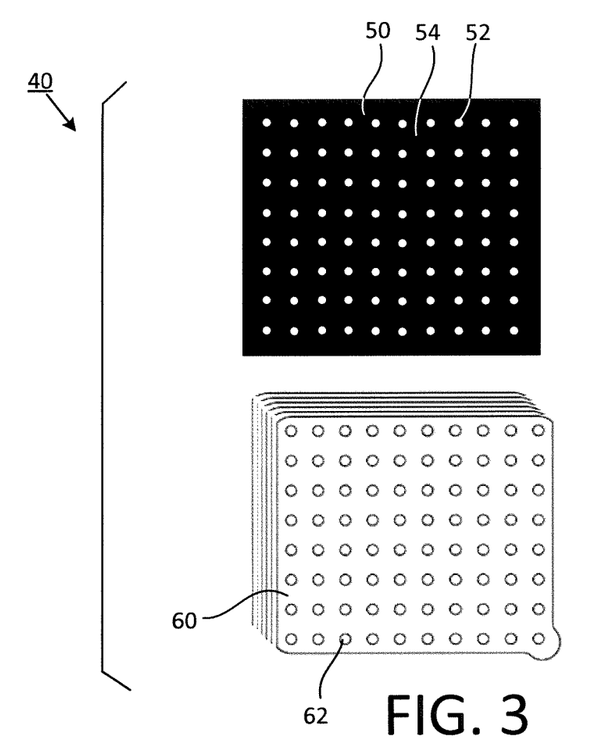
FIG. 3 is a front view of the hair binding layer separated from the rigid base.

FIG. 3 shows a removable cover 40 composed of a rigid base 50 and a hair binding layer 60. The rigid base 50 has a plurality of perforated holes 52 disposed on a surface 54 of the rigid base 50. The hair binding layer 60 is shown detached from the rigid base 50.

Figure 4:
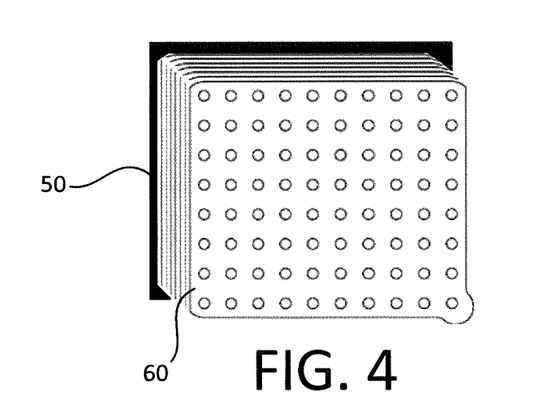
FIG. 4 is a front view of the hair binding layer attached to the rigid base.

FIG. 4 illustrates the hair binding layer 60 attached to the rigid base 50. The hair binding layer 60 may be attached to the rigid base 50 in a variety of different ways, such as with an adhesive and/or any other suitable method for attaching the hair binding layer 60 to the rigid base 50.

Figure 5:
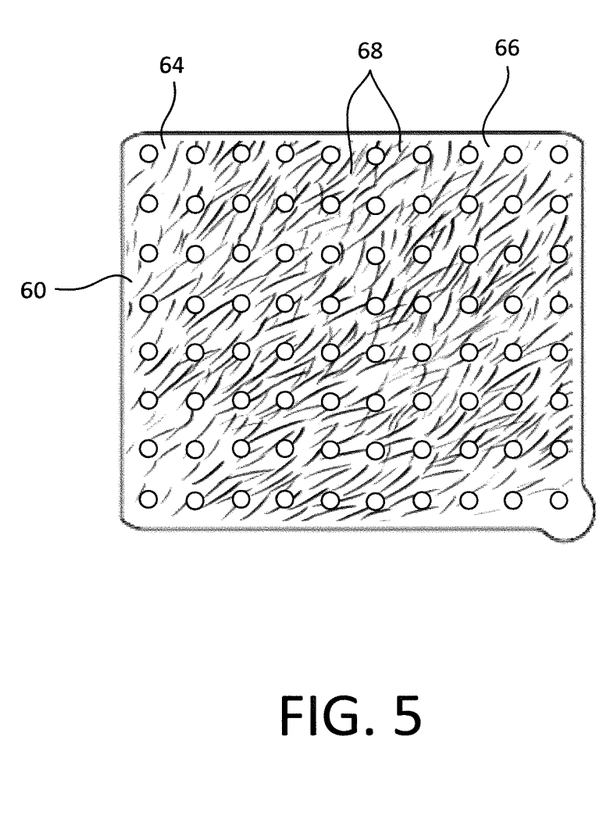
FIG. 5 is a front view of the front view of the hair binding layer attached to the rigid base with animal hair collected thereon after a brushing process of an animal.

As shown in FIG. 5, the hair binding layer 60 is adapted to collect animal hair 68 during the brushing process. The hair binding layer 60 has an outer surface 64 that collects the animal hair 68 during the brushing process. The hair binding layer 60 may include an adhesive 66 disposed on the outer surface 64. The hair binding layer 60 helps to pull the hair gently, removing and collecting loose animal hair 68 from the animal. Likewise, the hair binding layer 60 assists with removing fleas, ticks and other unwanted debris from the animal. The hair, fleas and debris will get caught on the sticky hair binding layer 60 and can only be removed when the user disposes of the hair binding layer 60. Disposal of the top layer of the hair binding layer 60 may be peeled away from another hair binding layer 60 located immediately below the layer peeled away full of animal hair 68. The remaining hair binding layer 60 is clean and free of hair 68 ready for the next usage.

Other materials for removing animal hair 68 may include incorporating an antistatic material onto the outer surface 64 of the hair binding layer 60 to assist in the release of static and allow the easy removal of the animal hair 68 from the body of the animal. Incorporating a scouring pad type of material onto the outer surface 64 of the hair binding layer 60 is also another mode for removing hair from the outer surface of the body of the animal.

As shown in FIG. 3, the hair binding layer 60 also includes a plurality of perforated holes 62. During construction of the removable cover 40, the perforated holes 52 in the rigid base 50 are aligned with the perforated holes 62 in the hair binding layer 60. The hair binding layer 60 is then secured to the rigid base 50 (as shown in FIG. 4) by for example, an adhesive. In use, and shown in FIG. 1, the bristles 22 in the brush head 20 are inserted through the perforated holes 52 in the rigid base 50 and the perforated holes 62 in the hair binding layer 60. In assembly, the bristles 22 are pushed through the removable cover 40 and the removable cover 40 is positioned and seated against a brush head upper surface 24 of the brush head 20 so that the bristles 22 are extended through the removable cover 40 at their longest extended position.

The removable cover 40 may be attached to the brush head 20 in a variety of different ways. For example, the removable cover 40 may be secured to the brush head 20 with a fastening mechanism. The fastening mechanism may be a clip, a clasp and/or any other type of suitable fastening mechanism in a secure manner so that the removable cover 40 does not become dislodged during use according to this subject disclosure. Various other modes for fastening the removable cover 40 to the brush head 20 are also possible.

The hair binding layer 60 may be made of one or more hair binding layers 60. Having multiple hair binding layers 60 layered on top of each other is efficient and beneficial. Likewise, layering the multiple hair binding layers 60 on top of the rigid base 50 makes cleaning and successive uses of the animal hairbrush 10 much easier and convenient. The hair binding layer 60 may be refillable and easy to replace out onto the rigid base 50 when the hair binding layers 60 are used up. The hair binding layers 60 may be lumped together, for example, in packs of 50 to 100, or more. The hair binding layers 60 are disposable and easy to clean up after use. That is, after brushing the animal's hair, the user can simply remove an uppermost hair binding layer 60 from the stack of hair binding layers 60 thereby removing all of the loose animal hair 68 collected from the animal during the brushing process.

Various advantages are provided by the construction of the animal hairbrush 10 having the removable cover 40. Various shapes are possible, such as but not limited to square, round, shaped like a paw or any other design shape. The animal hairbrush 10 may be made in a variety of different ways, such as for example, but not limited to, one or more parts to form a single integral or unitary part. The animal hairbrush 10 may be made of various non-toxic material having a material strength that can sustain a substantial bite pressure from an animal.

Alternatively, as shown in FIG. 2, a socket 26 may be provided in the brush head upper surface 24. The removable cover 40 may be configured to fasten to the socket 26. That is, the removable cover 40 is adapted to be fastened to the socket 26 so that it is securely locked into position during use. When the hair binding layers 60 are used up, the removable cover 40 may be unlocked from the socket 26 and removed to refill with a new set of hair binding layer 60 refills.

Figure 6:
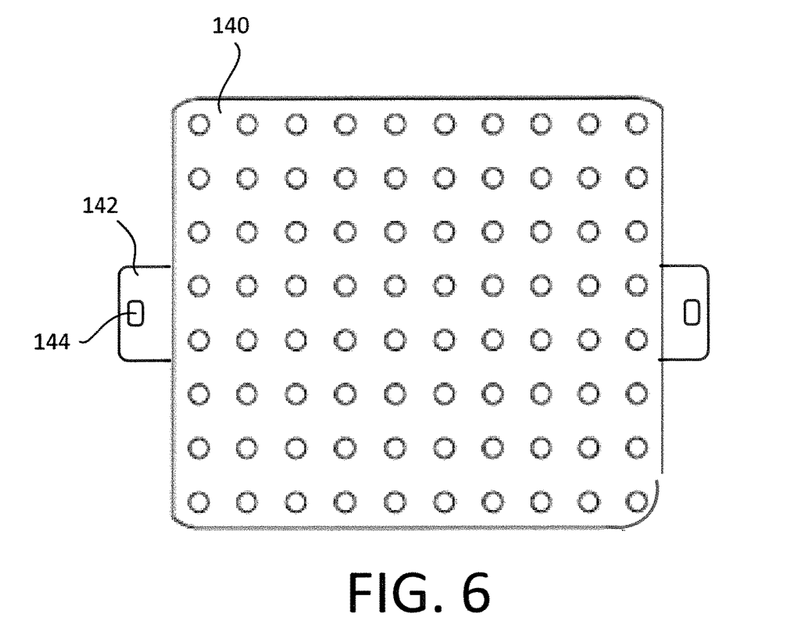
FIG. 6 is a front view of an embodiment for a fastening mechanism on the removable cover.

FIG. 6 is an embodiment for a fastening mechanism on a removable cover 140. The removable cover 140 includes a pair of closure flaps 142 having a locking aperture 144.

Figure 7:
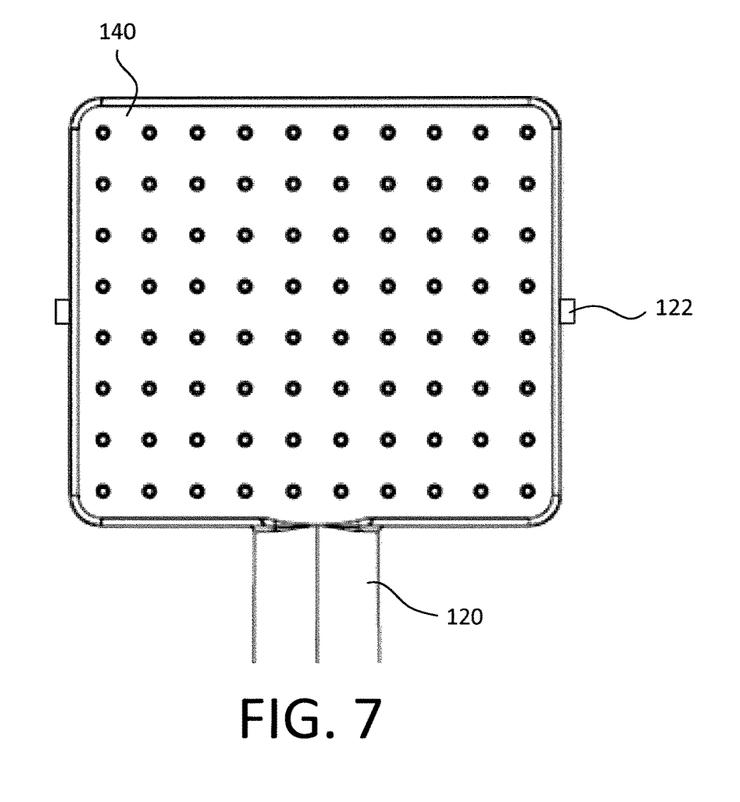
FIG. 7 is a front view of the embodiment for the fastening mechanism on the removable cover attached to the brush head.
Figure 8:
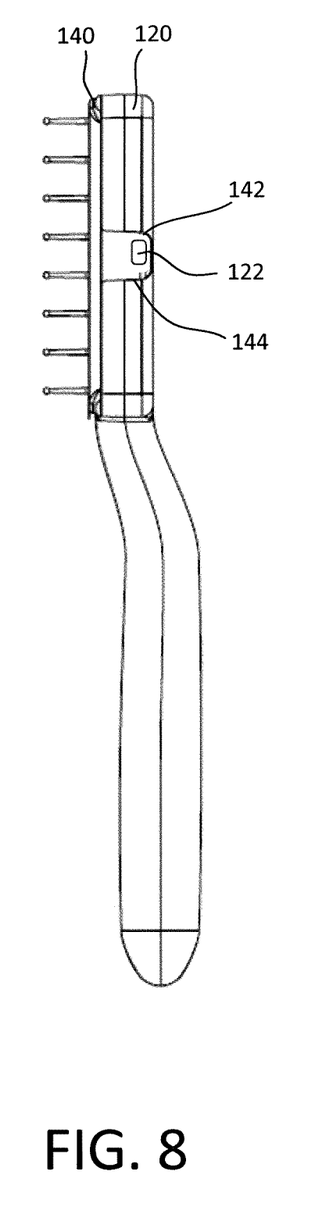
FIG. 8 is a side view of the embodiment for the fastening mechanism on the removable cover attached to the brush head.

FIGS. 7-8 show a front view of the fastening mechanism on the removable cover 140 attached to a brush head 120. In use, the locking aperture 144 on the closure flaps 142 lock onto a male projection 122 provided on the brush head 120. The closure flaps 142 are bent over the male projections 122 at approximately 90 degrees and are secured to the brush head 120. The closure flaps 142 may be selected from a material that is flexible to endure repeated twisting into and out of a locking position.

Figure 9:
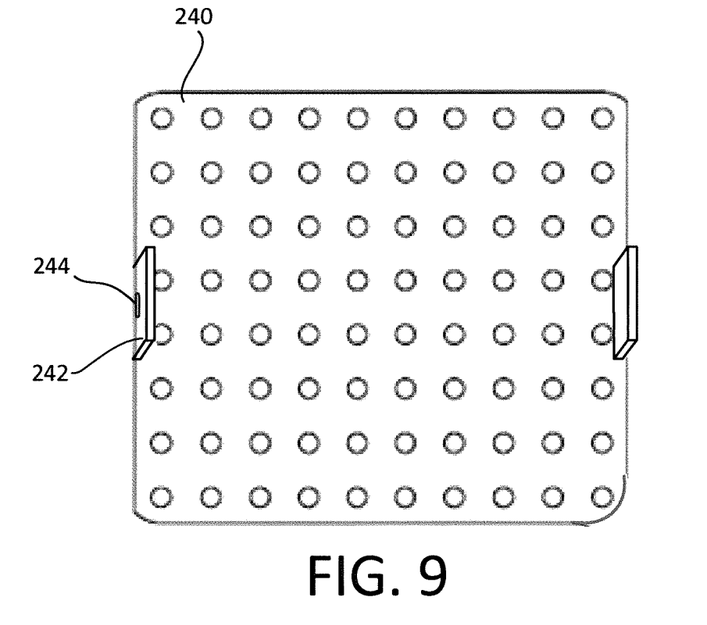
FIG. 9 is a rear view of another embodiment for a fastening mechanism on the removable cover.
Figure 10:
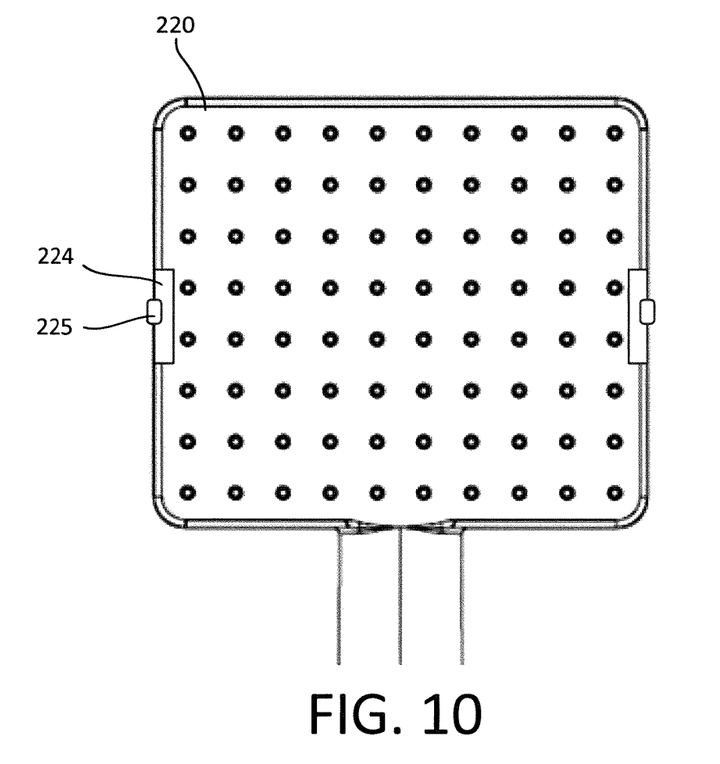
FIG. 10 is a front view of the brush head and the fastening mechanism for receipt of the removable cover.

FIG. 9 is a rear view of another embodiment for a fastening mechanism on a removable cover 240. As shown, the removable cover 240 includes a pair of projecting flaps 242 that extend outward from the removable cover 240. FIG. 10 shows a brush head 220 configuration adapted to receive the projecting flaps 242 from the removable cover. The brush head 220 has a pair of recesses 224 adjacent to a locking tab 225. As the removable cover 240 is positioned adjacent to the brush head 220, the projecting flaps 242 are slid into the recesses 224 respectively. Tabs 225 on the brush head 220 adjacent to the recesses 224 engage locking element 244 to secure the removable cover 240 to the brush head 220. To release the projecting flaps 242, tabs 225 are pressed to release. These are mere examples of exemplary locking mechanisms, however it is to be understood that various other configurations may be adapted according to this subject disclosure.

As shown in the figures, the brush head 20 of animal hairbrush 10, the removable cover 40 and the hair binding layer(s) 60 may take a variety of different shapes and/or sizes. They may be round, circular, square, rectangular, triangular, made to resemble a particular object, such as a bone, a flower, and/or any other suitable shape according to this subject disclosure.

As employed in this specification and annexed drawings, the term "or" is intended to mean an inclusive "or" rather than an exclusive "or." Moreover, articles "a" and "an" as used in the subject specification and annexed drawings should generally be construed to mean "one or more" unless specified otherwise or clear from context to be directed to a singular form.

What has been described above includes examples that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The illustrations and examples provided herein are for explanatory purposes and are not intended to limit the scope of the appended claims. It will be recognized by those skilled in the art that changes or modifications may be made to the above-described embodiment without departing from the broad inventive concepts of the subject disclosure. It is understood therefore that the subject disclosure is not limited to the particular embodiments which is described, but is intended to cover all modifications and changes within the scope and spirit of the subject disclosure.

What is claimed:

1. An animal hairbrush, comprising:
   a brush head having various bristles for grooming animal hair;
   a handle attached to the brush head; and
   a removable cover comprising;
      a rigid base; and
      a hair binding layer adapted to collect the animal hair, the removable cover having a plurality of perforations into which the various bristles on the brush head are aligned and placed within; and
   a fastening mechanism between the removable cover and the brush head, wherein a pair of closure projecting flaps extend outward from the removable cover and are adapted to be received by and secure within a pair of recesses in the brush head and wherein the projecting flaps are slid into the recesses in the brush head and engage tabs to secure the removable cover to the brush head.

2. The animal hairbrush recited in claim 1, wherein the hair binding layer is a plurality of removable hair binding layers layered on top of each other and onto the rigid base.

3. The animal hairbrush recited in claim 1, wherein the hair binding layer has an adhesive on an outer surface thereof.

4. An animal hairbrush, comprising:
   a brush head having various bristles for grooming animal hair;
   a handle attached to the brush head;
   a removable cover comprising;
      a rigid base; and
      a hair binding layer adapted to collect the animal hair, the removable cover having a plurality of perforations into which the various bristles on the brush head are aligned and placed within; and
   a fastening mechanism between the removable cover and the brush head, wherein a pair of closure flaps having locking apertures engage and secure to projections on the brush head.

5. The animal hairbrush recited in claim 4, wherein the closure flaps are bent over sides of the brush head so that the locking aperture in the closure flaps receive and secure the projections in the brush head in a secure manner.

6. An animal hairbrush, comprising:
   a brush head having various bristles for grooming animal hair;
   a handle attached to the brush head; and
   a removable cover comprising;
      a rigid base; and
      an adhesive layer adapted to collect the animal hair, the removable cover having a plurality of perforations into which the various bristles on the brush head are aligned and placed within; and
   a fastening mechanism between the removable cover and the brush head, wherein a pair of closure projecting flaps extend outward from the removable cover and are adapted to be received by and secure within a pair of recesses in the brush head and wherein the projecting flaps are slid into the recesses in the brush head and engage tabs to secure the removable cover to the brush head.

7. The animal hairbrush recited in claim 6, wherein the adhesive layer is a plurality of removable adhesive layer sheets layered on top of each other and onto the rigid base.

* * * * *